United States Patent [19]

Shepler

[11] Patent Number: 6,107,403
[45] Date of Patent: *Aug. 22, 2000

[54] COATING COMPOSITION CONTAINING HYDROXYL GROUPS, AND ITS USE IN PROCESSES FOR THE PRODUCTION OF COATINGS

[75] Inventor: Stewart Shepler, Bowling Green, Ohio

[73] Assignee: BASF Corporation, Southfield, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/878,881

[22] Filed: Jun. 19, 1997

Related U.S. Application Data

[63] Continuation of application No. 08/396,027, Feb. 28, 1995, abandoned.

[51] Int. Cl.[7] .................. C09D 133/14; C09D 167/02
[52] U.S. Cl. ..................... 525/131; 525/10; 525/127; 525/162; 525/176; 525/445
[58] Field of Search .............................. 525/10, 176, 445, 525/131, 127, 162

[56] References Cited

U.S. PATENT DOCUMENTS

| 4,354,014 | 10/1982 | Wolf | 528/45 |
| 5,124,176 | 6/1992 | Marrion | 525/176 |

FOREIGN PATENT DOCUMENTS 9201757  2/1992  WIPO .

*Primary Examiner*—Patricia A. Short

[57] ABSTRACT

The present invention relates to coating compositions comprising (A) at least one component which contains hydroxyl groups, consisting of at least one polyacrylate resin which contains hydroxyl groups and (B) at least one crosslinking agent, characterized in that an aromatic carboxylic acid or of an anhydride is added to component (A) after its preparation or to the coating composition.

17 Claims, No Drawings

COATING COMPOSITION CONTAINING HYDROXYL GROUPS, AND ITS USE IN PROCESSES FOR THE PRODUCTION OF COATINGS

This application is a continuation of application Ser. No. 08/396,027, filed Feb. 28, 1995, which is now abandoned.

BACKGROUND OF THE INVENTION

The present invention relates to a coating composition which comprises:

(A) at least one component which contains hydroxy groups, and (B) at least one crosslinking agent, characterized in that aromatic mono- and/or polycarboxylic acid and/or an anhydride of an aromatic polycarboxylic acid are added to component (A) after its preparation or to the coating composition.

The present invention also relates to processes for the production of a protective and/or decorative coating on a substrate surface and to the use of the coating composition in the area of automotive refinishing.

DE-A-40 24 204 has already disclosed coating compositions which contain, as binder, a polyacrylate resin which contains hydroxyl groups and has been prepared in the presence of a polyester which contains hydroxyl groups. However, especially when these coating compositions are applied at low temperatures, from about 8 to 12° C., the masking resistance and solvent resistance of the resulting coatings is in need of improvement.

In the area of the finishing of large-size vehicles, for example the finishing of goods-vehicle bodies, the masking resistance of the resulting coatings is of particular importance. This is because large-size vehicles are commonly provided with written characters, whose application requires the adjacent area to be masked off. If the masking resistance is inadequate, the marks must be removed by hand, by laborious sanding and polishing, which entails a considerable financial outlay.

Furthermore, the coating compositions must also cure as rapidly as possible, in order to avoid excessive standing times between the individual operations in the coating plant. These coating compositions must also, of course, possess good application properties and lead to coatings having good mechanical properties.

In addition, DE-A-31 33 769 discloses that the curing rate of one-component polyurethane coating compositions based on amines and on compounds containing isocyanate groups can be increased by the addition of benzoic acid. These coating compositions known from DE-A-31 33 769 differ from the coating compositions according to the invention in that no description is given of coating compositions based on polymers containing hydroxyl groups and on crosslinking agents containing isocyanate groups.

Futhermore, U.S. Pat. No. 3,897,396 discloses that the curing rate of molding compositions based on polyurethane-ureas can be increased by the addition of alkyl- or alkozybenzoic acid, without thereby shortening the pot life.

These compositions known from U.S. Pat. No. 3,897,396 differ from the coating compositions according to the invention in that U.S. Pat. No. 3,897,396 describes molding compositions rather than coating compositions. Furthermore, these molding compositions known from U.S. Pat. No. 3,897,396 contain binders comprising prepolymers which contain isocyanate groups and are based on the reaction product of a polyetherpolyol, polyesterpolyol or hydrocarbonpolyol with isocyanate and a crosslinking agent comprising polyamines. Compositions based on acrylate copolymers containing hydroxyl groups and on compounds containing isocyanate groups, on the other hand, are not described in U.S. Pat. No. 3,897,396.

Finally, German Patent Application P 44 07 409.3, which is not a prior publication, discloses coating compositions containing a polyacrylate resin, which contains hydroxyl groups and is based on hydroxy-n-butyl acrylate, and a crosslinking agent. The preparation of the polyacrylate resin in the presence of a polyester resin, however, is not described in this application.

SUMMARY OF THE INVENTION

The object of the present invention is therefore to provide coating compositions based on polyesters containing hydroxyl groups and on polyacrylate resins, which compositions exhibit rapid drying coupled with a long pot life, i.e. which can be processed in the ready-to-use state over a long period. In particular, the coating compositions should provide a masking resistance of the resulting coatings which is improved in comparison with that of conventional coating compositions. Furthermore, the coating compositions should at least meet the requirements conventionally placed on a topcoat or clearcoat. The coating compositions should therefore, for example, exhibit good spray-mist assimilation, good topcoat holdout and good leveling. In addition, they should lead to coatings having good solvent resistance and a high degree of surface hardness. Furthermore, the coating compositions should cure at room temperature or at slightly elevated temperature, so that they can be employed in automotive refinishing.

The [lacuna] invention is surprisingly achieved by the coating compositions of the type mentioned initially, which are characterized in that at least one aromatic mono- and/or polycarboxylic acid and/or an anhydride of an aromatic polycarboxylic acid are added to component (A) after its preparation or to the coating composition.

The invention furthermore relates to a process for the production of a protective and/or decorative coating on a substrate surface, using these coating compositions, and to the use of these coating compositions for refinishing, either as a pigmented or nonpigmented topcoat.

It is surprising and was not foreseeable that the coating compositions according to the invention, even on curing at low temperatures, cure rapidly while at the same time retaining long processibility (pot life). A particular advantage is the masking resistance of the resulting coatings, which is improved in comparison with that of conventional coating compositions and is of particular importance when the coating compositions are used in the area of the finishing of large-size vehicles.

An additional advantage is that the improvement of the masking resistance of the coatings can surprisingly be achieved without any impairment of the leveling, topcoat holdout and pot life. Finally, an additional advantage is that the resulting coatings possess good solvent resistance and surface hardness.

The individual components of the coating composition according to the invention are now described in more detail.

The coating composition according to the invention contains as binder a component (A) which contains hydroxyl groups and comprises:

(A1) from 20 to 60% by weight, preferably from 30 to 50% by weight, of at least one polyester, and (A2) from 40 to 80% by weight, preferably from 50 to 70% by weight, at least one polyacrylate resin which contains hydroxyl groups and has been prepared at least partially in the presence of components (A1).

The binder employed as component (A) preferably has a hydroxyl number of from 80 to 150, particularly preferably from 85 to 105, mg of KOH/g and an acid number of from 0.1 to 10, preferably from 4 to 8, mg of KOG/g.

It is essential to the invention that the polyester (A1) has an OH number of from 90 to 130, preferably from 90 to 110, mg of KOH/g, an acid number of less than 10 mg of KOG/g, preferably from 1 to 8 mg of KOH/g, a number-average molecular weight of from 1300 to 3500, preferably from 1350 to 2000, and a polydispersity of from 5 to 50, preferably from 5 to 10. The polydispersity is in this context defined as the ratio of the weight-average molecular weight to the number-average molecular weight. The molecular weights are in each case determined by gel permeation chromatography against a polystyrene standard.

The polyesters (A1) are preferably obtainable by reacting:
p1) polycarboxylic acids or their esterifiable derivatives, together if desired with monocarboxylic acids,
p2) polyols, together if desired with monools,
p3) if desired, other modifying components, and
p4) if desired, a component which is capable of reaction with the reaction product of (p1), (p2) and, if appropriate, (p3).

Examples of polycarboxylic acids which can be employed as component (p1) are aromatic, aliphatic and cycloaliphatic polycarboxylic acids. It is preferred to employ aromatic and/or aliphatic polycarboxylic acids as component (p1).

Examples of suitable polycarboxylic acids are phthalic acid, isophathalic acid, terephthalic acid, halophthalic acids, such as tetrachloro- or tetrabromophthalic acid, adipic acid, glutaric acid, acelaic [sic] acid, sebacic acid, fumaric acid, maleic acid, trimellitic acid, pyromellitic acid, tetrahydrophthalic acid, hexahydrophthalic acid, 1,2-cyclohexanedicarboxlic acid, 1,3-cyclohexane-discarboxlic acid, 1,4-cyclohexane-dicarboxlic acid, 4-methylhexahydrophthalic acid, endomethylenetetrahydropthalic acid, tricyclodecane-dicarboxlic acid, endoethylenehexahydropthalic acid, camphoric acid, cyclohexanetetracarboxlic acid, cyclobutanetetracarboxylic acid etc. The cycloaliphatic polycarboxylic acids may be employed either in their cis or in their trans form or as a mixture of the two forms. Also suitable are the esterfiable derivatives of the abovementioned polycarboxylic acids, for example their single or multiple esters with aliphatic alcohols having 1 to 4 carbon atoms or hydroxy alcohols having a to 4 carbon atoms. In addition, it is also possible to employ the anhydrides of the abovementioned acids, where they exist.

If desired, monocarboxylic acids can also be employed together with the polycarboxylic acids, examples being benzoic acid, tert-butylbenzoic acid, lauric acid, isonoanoic acid and fatty acids of naturally occurring oils. The monocarboxylic acid preferably employed is isonoanoic acid.

Alcohol components (p2) suitable for the preparation of the polyester or alkyd resin (A1) are polyhydric alcohols such as ethylene glycol, propanediols, butanediols, hexanediols, neopentylglycol, diethylene glycol, cyclohexanediol, cyclohexanedimethanol, trimethylpentanediol, ethylbutylpropanediol ditrimethylolpropane, trimethylolethane, trimethylolpropane, glycerol, pentaerythritol, dipentaerythritol, trishydroxyethyl isocyanate, polyethylene glycol, polypropylene glycol, together if desired with monohydric alcohols, for example butanol, octanol, lauryl alcohol, and ethoxylated and propoxylated phenols.

Suitable components (p3) for the preparation of the polyesters (A1) are in particular compounds which contain a group which is reactive with respect to the functional groups of the polyester, with the exception of the components cited as component (p4). As the modifying component (p3) it is preferred to use polyisocyanates and/or diepoxide compounds, and also if desired, monoisocyanates and/or monoepoxide compounds. Examples of suitable components (p3) are described in DE-A-40 24 204 on page 4, lines 4 to 9.

Compounds which are suitable as components (p4) for the preparation of the polyesters or alkyd resins (A1) are those which also contai, in addition to a group which is reactive with respect to the functional groups of the polyester (A1), a tertiary amino group, for example monoisocyanates having at least one tertiary amino group or mercapto compounds having at least one tertiary amino group. For details reference is made to De-A-40 24 204, page 4, lines 10 to 49.

The polyesters (A1) are prepared by the known methods of esterification (cf. various standard works, for example:
1. Temple C. Patton, Alkyd Resin Technology, Interscience Publishers John Wiley & Sons, New York, London 1962;
2. Dr. Johannes Scheiber, Chemie und Technologie der kunstlichen Harze [Chemistry and Technology of Synthetic Resins], Wissenschaftliche Verlagsgesellschaft mbH, Stuttgart, 1943;
3. Hans Wagner+Hans-Friedrich Sarx, Lackkunstharze [Synthetic Resins for Coatings], 4th edition, Karl Hanser Verlag, Munich, 1959;
4. Ullmanns Encyklopedie der technischen Chemie [Ullmann's Encyclopedia of Industrial Chemistry], volume 14, pages 80 to 106 (1963).

This reaction is conventionally carried out at temperatures of between 180 and 280° C, in the presence if desired of an appropriate esterification catalyst, for example lithium octanoate, dibutyltin oxide, dibutyltin dilaurate, para-toluene-sulfonic acid and the like.

The preparation of the polyesters (a1) is conventionally carried out in the presence of small quantities of a suitable solvent as entraining agent. Examples of the entraining agents employed are aromatic hydrocarbons, in particular xylene and (cyclo)aliphatic hydrocarbons, for example cyclohexane.

As polyacrylate resins, there are suitable such resins which contain hydroxy and/or carboxy groups or amide groups or epoxy groups as crosslinking groups. In particular, there are employed hydroxy and/or carboxy group-containing polyacrylate resins. Hydroxy group-containing polyacrylate resins having an OH number in the range of from 20 to 360 mgKOH/g, more preferably of from 40 to 200 mgKOH/g, and an acid number in the range of from 0 to 80 mgKOH/g, more preferably of from 0 to 50 mgKOH/g, and/or group-containing polyacrylate resins having an OH number in the range of from 0 to 200 mgKOH/g, more preferably of from 0 to 100 mgKOH/g, and an acid number in the range of from 40 to 140 mgKOH/g, more preferably of from 40 to 100 mgKOH/g are preferred.

Preferably, there are employed polyacrylate resins having a number average molecular weight of at most 10,000 whereby polyacrylate resins having a number average molecular weight of from 1,000 to 5,000 are particularly preferred. The number average molecular weight was determined by gel-permeation chromatography using polystyrene as the standard.

The polyacrylate resins may be prepared in accordance with usual processes as for example solution polymerization in the presence of an initiator and, optionally, in the presence of a polymerization regulator. The polymerization is carried out at temperatures in the range of from 100 to 180° C.

Peroxide group-containing initiators, azo group-containing initiators, and thermolabile compounds as for example compounds on the basis of highly substituted ethane derivatives, are suitable as initiators.

For the preparation of the polyacrylate resins, there may be employed all monomers which are usually employed for this purpose.

As examples, there are suitable cycloaliphatic esters of acrylic acid and/or methacrylic acid, for example cyclohexyl acrylate, cyclohexyl methacrylate, 4-t-butylcyclohexyl acrylate, 4-t-butylcyclohexyl methacrylate, isobornyl acrylate, and isobornyl methacrylate. Preferably there are employed 4-t-butylcyclohexyl acrylate and/or 4-t-butylcyclohexyl methacrylate.

In addition, there are suitable for the preparation of said polyacrylate resins hydroxy group-containing monomers, e.g. hydroxyalkyl esters of a,B-unsaturated carboxylic acids with compounds containing primary or secondary hydroxy groups. If a high reactivity of the acrylic copolymer is desired, there may be employed hydroxyalkyl esters having primary hydroxy groups exclusively. If the polyacrylate is intended to be less reactive, there may be used hydroxyalkyl esters having secondary hydroxy groups exclusively. Of course, there may also be employed mixtures of hydroxyalkyl esters having primary hydroxy groups and of hydroxyalkyl esters having secondary hydroxy groups.

Examples of suitable hydroxyalkyl esters of a,B-unsaturated carboxylic acids with compounds having primary hydroxy groups are hydroxyethyl acrylate, hydroxypropyl acrylate, hydroxybutyl acrylate, hydroxyamyl acrylate, hydroxyhexyl acryalte, and hydroxyoctyl acrylate as well as the corresponding methacrylates. As examples of suitable hydroxyalkyl esters having secondary hydroxy groups, there may be mentioned 2-hydroxybutyl acrylate, 3-hydroxybutyl acrylate as well as the corresponding methacrylates. It goes without saying that the corresponding esters of other a,B-unsaturated carboxylic acids may also be employed, e.g. esters of crotonic acid or isocrotonic acid.

Preferably, the hydroxy group-containing monomer may at least partly be a reaction product of 1 mole hydroxyethyl acrylate and/or hydroxyethyl methacrylate and, on average, 2 moles of -caprolactame. As the hydroxy group-containing mnomer, there may also be used, at least partly, a reaction product of acrylic acid and/or methacrylic acid with an equivalent amount of a glycidyl ester of a carboxylic acid having a tertiary a-carbon atom. Glycidyl esters of highly branched monocarboxylic acids are commercially available under the trade name "Cardura". The reaction of said acrylic acid or methacrylic acid with said glycidyl ester of a carboxylic acid having a tertiary a-carbon atom may be carried out before, during or after the polymerization reaction.

Furthermore, alkyl esters of ethylenically unsaturated carboxylic acids as for example alkyl esters of (meth)acrylic acid, crotonic acid, isocrotonic acid and maleic acid are suitable. As examples of such monomers, there are mentioned methyl (meth)acrylate, ethyl (meth) acrylate, butyl (meth)acrylate, t-butyl (meth) acrylate, isopropyl (meth) acrylate, isobutyl (meth) acryalte, pentyl (meth)acrylate, isoamyl (meth) acrylate, hexyl (meth)acrylate, 2-ethylhexyl (meth) acrylate, furfuryl (meth)acrylate, octy (meth) acrylate, 3,5,5-trimethylhexyl (meth)acryalte, decyl (meth) acrylate, lauryl (meth)acrylate, hexadecyl (meth) acrylate, octadecyl (meth)acrylate, stearyl (meth) acrylate, and ethyl triglycol (meth)acrylate.

In addition, vinylaromatic compounds are also suitable. Preferably, the vinylaromatic compound contains 8 to 9 carbon atoms per molecule. Styrene, vinyltoluenes, a-methyl styrene, chlorostyrenes, o-, m- and p-methylstyrene, 2,5-dimethylstyrene, p-methoxystyrene, p-t-butylstyrene, p-dimethylaminostyrene, p-acetamidostyrene and m-vinylphenol are examples of suitable compounds. Preferably, vinyltoluenes as well as particularly styrene are employed.

Further suitable monomers are alkoxyethyl acrylates, aryloxyethyl acrylates as well as the corresponding methacrylates as for example butoxyethyl (meth)acrylate and phenoxyethyl (meth)acrylate as well as methacrylonitrile and acrylonitril and alkyl esters of other ethylenically unsaturated carboxylic acids, e.g. alkyl esters of crotonic acid and isocrotonic acid as well as polymerizable vinyl ethers and vinyl esters.

Furthermore, there are suitable the hydroxy group-containing polyacrylate resins described in German Patent Application No. DE-A 38 23 005 on page 2, line 52, to page 6, line 19, as well as in German Patent Application No. De-A 35 34 874 on page 4, line 43, to page 6, line 52.

In addition, there are suitable the carboxy group-containing polyacrylate resins described in German Patent Application No. De-A 39 18 669 on page 2, line 59, to page 7, line 2, as well as in German Patent Application No. DE-A 41 33 420 on page 2, line 61, to page 6, line 60.

Furthermore, hydroxy group-containing polyacrylate resins as described in the unpublished German Patent Application No. P 44 07 415.8 are suitable, which are obtainable by polymerizing.

($m_1$) 0 to 80% by weight, preferably 0 to 30% by weight, of a cycloaliphatic ester of methacrylic acid and/or acrylic acid or a mixture of such monomers;

($m_2$) 10 to 50% by weight, preferably 15 to 40% by weight, of a hydroxy group-containing alkyl ester of methacrylic acid and/or acrylic acid or a mixture of such monomers;

($m_3$) 0 to 25% by weight, preferably 0 to 15% by weight, of a hydroxy group-containing ethylenically unsaturated monomer different from ($m_1$) and ($m_2$) or a mixture of such monomers;

($m_4$) 5 to 80% by weight, preferably 5 to 30% by weight, of an aliphatic esterof methacrylic acid and/or acrylic acid different from ($m_1$), ($m_2$) and ($m_3$) or a mixture of such monomers;

($m_5$) 0 to 40% by weight, preferably 10 to 30% by weight, of a vinylaromatic hydrocarbon different from ($m_1$), ($m_2$), ($m_3$) and ($m_4$) or a mixture of such monomers; and ($m_6$) 0 to 40% by weight, preferably 0 to 30% by weight, or a further ethylenically unsaturated monomer different from ($m_1$), ($m_2$), ($m_3$), ($m_4$) and ($m_5$) or a mixture of such monomers;

to a polyacrylate resin having a number average molecular weight Mn of from 1,000 to 5,000, a ratio of the weight average molecular weight Mw to the number average molecular weight Mn of less than 5.0 preferably of 1.8 to 4.0, and an OH number of 60 to 180 mgKOH/g, preferably of 100 to 150 mgKOH/g, whereby the sum of the weight portions of components ($m_1$) to ($m_6$) is always 100% by weight, and whereby only monomers or mixtures of monomers are employed as component ($m_2$) which, when the respective polymer is polymerized alone, result into a polyacrylate and/or polymethacrylate resin having a glass transition temperature of from 10° C. to +6° C. or of from +60° C. to 80° C.

The use of the above polyacrylate resins results into coating compositions which, when used as a tansparent coating varnish, give coatings exhibiting an adhesion improved over conventional coatings.

3-Hydroxypropyl methacrylate and/or 2-hydroxypropyl methacrylate and/or 3-hydroxy-propyl acrylate and/or 2-hydroxypropylacrylate are preferably used as component ($m_2$). Examples of the monomers suitable as components ($m_1$) and ($m_3$) to ($m_6$) are the monomers described in the description of the acrylate resin used in accordance with the present invention.

Furthermore, the polyacrylate resins described in the unpublished German Patent Application No. P 44 07 409.3 are suitable, which are obtainable by polymerizing ($P_1$) 10 to 51% by weight of a mixture of ($P_{11}$) one or more monomers selected from the group of 4-hydroxy-n-butyl acrylate and/or 4-hydroxy-n-butyl methacrylate and/or 3-hydroxy-n-butyl acrylate and/or 3-hydroxy-n-butyl methacrylate and of:

($P_{12}$) one or more monomers selected from the group of 3-hydroxy-n-propyl acrylate and/or 3-hydroxy-n-propyl methacrylate and/or 2-hydroxy-n-propyl acrylate and/or 2-ydroxy-n-propyl methacrylate;

(P2) 0 to 22% by weight of a hydroxy group-containing ester of acrylic acid or methacrylic acid different from ($P_1$) and having at least 5 carbon atoms in the alcohol residue, or a mixture of such monomers;

($P_3$) 28 to 85% by weight of an aliphatic or cycloaliphatic ester of acrylic acid or methacrylic acid different from ($P_1$) and ($P_2$) and having at least 4 carbon atoms in the alcohol residue, or a mixture of such monomers;

($P_4$) 0 to 25% by weight of a vinylaromatic hydrocarbon different from ($P_1$), ($P_2$) and ($P_3$) or a mixture of such monomers;

($P_5$) 0 to 5% by weight of an ethylenically unsaturated carboxylic acid or a mixture of ethylenically unsaturated carboxylic acids; and ($p_6$) 0 to 20% by weight of an ethylenically unsaturated monomer different from ($p_1$), ($p_2$), ($p_3$), ($p_4$) and ($p_5$) or a mixture of such monomers;

to a polyacrylate resin having a hydroxy number of 60 to 200 mgKOH/g, an acid number of 0 to 35 mgKOH/g and a number average molecular weight of 1,000 to 5,000, whereby the sum of the weight portions of components ($p_1$) to ($p_6$) is always 100% by weight.

Examples of the compounds suitable as the monomer components ($p_1$) to ($p_6$) are the compounds mentioned above in the description of the acrylate resin (A).

The use of the above polyacrylate resins results into coating compositions which, when used as a transparent coating varnish, give coatings exhibiting an adhesion improved over conventional coatings.

The polyacrylates employed as component (A2) in the coating compositions according to the invention have OH numbers of from 50 to 150 mg of KOH/g, preferably from 70 to 105 mg of KOH/g, and acid numbers of from 0 to 10 mg of KOH/g, preferably from 0 to 8 mg of KOH/g, the OH numbers and acid numbers in each case being calculated without taking into account the polyester fraction. The number-average molecular weights of the polyacrylate resins prepared in the presence of the polyesters are generally between 1500 and 5000, preferably between 2000 and 4000, in each case measured by GPC against a polystyrene standard.

It is essential to the invention that the polyacrylate resin (A2) has been prepared at least partially in the presence of the polyester resin (A1). Advantageously at least 40% by weight and, particularly advantageously, from 50 to 70% by weight of component (A2) are prepared in the presence of component (A1).

The possible residual quantity of component (A2) is added to the binder solution or to the coating composition subsequently. In this context it is possible for this prepolymerized resin to have the same monomer composition as the addition polymer resin built up in the presence of the condensation polymer resin. However, it is also possible for a condensation polymer. resin and/or addition polymer resin containing hydroxyl groups and having a different monomer composition to be added. Furthermore, it is possible to add a mixture of different addition polymer resins and/or condensation polymer resins, it being possible for a resin to have the same monomer composition as the addition polymer resin built up in the presence of the condensation polymer resin.

It is also essential to the invention that the poly-acrylate resin (A2) comprises one or more monomers selected from the group consisting of 4-hydroxy-n-butyl acrylate, 4-hydroxy-n-butyl methacrylate, 3-hydroxy-n-butyl acrylate, 3-hydroxy-n-butyl methacrylate and/or hydroxyethyl methacrylate, as monomer components which are incorporated by polymerization. The acrylate resin (A2) preferably contains one or more monomers selected from the group consisting of 4-hydroxy-n-butyl acrylate, 4-hydroxyl-n-butyl methacrylate, 3-hydroxy-n-butyl acrylate and/or 3-hydroxy-n-butyl methacrylate, together if desired with hydroxyethyl methacrylate. The preparation of the polyacrylate resins which are employed in accordance with the invention can be carried out by polymerization methods which are generally well known. Polymerization methods for the preparation of polyacrylate resins are generally known and have been described in numerous references (cf. e.g.: Houben-Weyl, Methoden der organischen Chemie [Methods in Organic Chemistry], 4th edition, volume 14/1, pages 24 to 255 (1961)).

The polyacrylate resin solutions as well as the coating compositions prepared by using said polyacrylate resin solutions furthermore contain one or more organic solvents. Said solvents are usually employed in amounts of from 20 to 70% by weight, preferably of from 25 to 65% by weight, based. on the total weight of the coating composition.

The polyacrylate resins employed in accordance with the invention are preferably prepared using the solution polymerization method. In this method it is conventional to take an organic solvent or solvent mixture together with the polyester (A1) and to heat the mixture to boiling. The monomer mixture to be polymerized and one or more polymerization initiators are then added continuously to this mixture of organic solvent or solvent mixture and polyester resin (A1). Polymerization takes place at temperatures of between 100 and 160° C., preferably between 130 and 150° C.

The polymerization is preferably carried out in a high-boiling organic solvent which is inert with respect to the monomers employed. Examples of suitable solvents are relatively highly substituted aromatics, for example Solvent Naphtha, heavy benzene, various Solvesso grades, various Shellsol grades and Deasol and relatively high-boiling aliphatic and cycloaliphatic hydrocarbons, for example various white spirits, mineral terpentine oil, tetralin and decalin and various esters, for example ethylglycol acetate, butyl-glycol acetate, ethyldiglycol acetate and the like.

The polymerization initiators preferably employed are initiators which form free radicals. The nature and quantity of initiator are usually selected such that, at the temperature of polymerization, the supply of free radicals is substantially constant during the feed phase.

Cited examples of initiators which can be employed are di-tert-butyl peroxide, tert-butyl hydroperoxide, tert-butyl peroxybenzoate, tert-butyl peroxypivalate, tert-butyl peroxy-3,5,5trimethylhexanoate [sic], tert-butyl peroxy-2-ethylhexanoate, dicumyl peroxide, cumyl hydroperoxide, tert-amyl peroxybenzoate, tert-amyl peroxy-2-ethylhexanoate, diacyl peroxides, for example diacetyl peroxide, peroxyketals, 2,2-di(tert-amylperoxy-)propane [sic], ethyl 3,3-di(tert-amylperoxy-)butyrate [sic] and thermally labile highly substituted ethane derivatives, based for example on silyl-substituted ethane derivatives and on benzopinacol. Furthermore, it is also possible to employ aliphatic azo compounds, for example azoisovaleronitrile and azobiscyclohexanenitrile.

The initiators employed are. primarily those containing tert-butyl groups, for example di-tert-butyl peroxide, tert-butyl hydroperoxide, 2,2-di-tert-butylperoxybutane and 1,3-bis(tert-butylperoxyisopropyl)benzene, since they promote grafting of the acrylate onto the polyester.

The quantity of initiator is in most cases from 0.1 to 8% by weight, based on the quantity of monomer to be processed, although it can be even higher if desired. The initiator, dissolved in a portion of the solvent employed for the polymerization, is metered in gradually during the polymerization reaction. The initiator feed preferably takes from about 0.5 to 2 hours longer than the monomer feed, so as to achieve a good action during the after-polymerization phase as well. In another preferred preparation variant the feed of initiator is commenced about 15 minutes before the addition of the monomers, so as to ensure a good supply of free radicals at the beginning of the polymerization. If initiators are employed which only have a low rate of decomposition under the prevailing reaction conditions, then it is also possible to include the initiator in the initial charge.

The polymerization conditions (reaction temperature, feed time of the monomer mixture, nature and quantity of the organic solvents and polymerization initiators, possible use of molecular weight regulators, for example mercaptans, thioglycolic esters and chlorine-containing hydrogen compounds) are selected such that the polyacrylate resins employed in accordance with the invention have the desired molecular weight.

The acid number of the polyacrylate resins employed in accordance with the invention can be adjusted by the person skilled in the art via the use of appropriate quantities of monomers which contain carboxyl groups. Similar comments apply to the adjustment of the hydroxyl number. It can be controlled via the quantity of hydroxyl group-containing monomers which are employed.

The polyacrylate resins which contain hydroxyl groups and are preferably employed as component (A2) are obtainable by polymerizing (a) from 5 to 50% by weight, preferably from 10 to 35% by weight, of one or more monomers selected from the group consisting of 4-hydroxy-n-butyl acrylate, 4-hydroxy-n-butyl methacrylate, 3-hydroxy-n-butyl acrylate, 3-hydroxy-n-butyl methacrylate and/or hydroxyethyl methacrylate (b) from 0 to 50% by weight, preferably from 0 to 30% by weight, of an ethylenically unsaturated, copolymerizable monomer which is different from (a) and contains hydroxyl groups, or a mixture of such monomers, (c) from 5 to 95% by weight, preferably from 15 to 55% by weight, of an aliphatic and/or cycloaliphatic ester of methacrylic and/or acrylic acid which is different from (a) and (b), or a mixture of such monomers, (d) from 0 to 30% by weight, preferably from 5 to 15% by weight, of a copolymerizable vinyl ester which is different from (a), (b) and (c), or a mixture of such monomers, (e) from 0 to 85% by weight, preferably from 15 to 60% by weight, of an aromatic vinyl hydrocarbon which is different from (a), (b), (c) and (d), or a mixture of such monomers, and (f) from 0 to 10% by weight, preferably from 0 to 8% by weight, of a further ethylenically unsaturated monomer which is different from (a), (b), (c), (d) and (e), or a mixture of such monomers, at least partially in the presence of component (A1), to give the polyacrylate resin (A2), the sum of the proportions by weight of monomers (a) to (f) being in each case 100% by weight.

As a further hydroxyl group-containing monomer (component (b)) for the preparation of the acrylate resin, it is also possible, if desired, to employ other hydroxyl group-containing esters of acrylic and/or methacrylic acid. Particular examples of hydroxyl group-containing monomers which are suitable as component (b) are the reaction product of 1 mol of hydroxyethyl acrylate and/or hydroxyethyl methacrylate and on average 2 mol of -caprolactone and/or the reaction product of acrylic acid and/or methacrylic acid with the glycidyl ester of a carboxylic acid having a tertiary carbon atom. These glycidyl esters of -branched carboxylic acids having 11 to 13 carbon atoms (Versatic acid) are commercially available, for example, from Shell under the name Cardura. The reaction of the acrylic and/or methacrylic acid with the glycidyl ester can be carried out before, during or after the polymerization.

As component (b) it is also possible to employ, however, alkyl esters of acrylic acid and/or methacrylic acid, for example hydroxyethyl acrylate, hydroxypropyl (meth) acrylate, hydroxypentyl (meth)acrylates, hydroxyhexyl (meth)acrylates, hydroxyoctyl (meth)acrylates etc., and/or the esters, different from (a) and containing hydroxyl groups, of a polymerizable, ethylenically unsaturated carboxylic acid, for example the hydroxyl group-containing esters of crotonic and isocrotonic acid.

As component (c) it is possible in principle to employ any aliphatic or cycloaliphatic esters of acrylic acid or of methacrylic acid which are different from (a) and (b), or a mixture of such monomers. Examples are aliphatic esters of acrylic acid and of methacrylic acid, for example methyl, ethyl, propyl, n-butyl, isobutyl, tert-butyl, n-hexyl, 2-ethylhexyl, stearyl and lauryl acrylate and methacrylates, and cycloaliphatic esters of (meth)acrylic acid, for example furfuryl, cyclohexyl, isobornyl and t-butylcyclohexyl acrylate and methacrylate.

Vinyl esters of monocarboxylic acids are employed as component (d). Preferably employed are vinyl esters of -branched monocarboxylic acids having 5 to 15 carbon atoms per molecule. The branched monocarboxylic acids can be obtained by reacting formic acid or carbon monoxide and water with olefins in the presence of a liquid, strongly acidic catalyst; the olefins may be products of the cracking of paraffinic hydrocarbons, such as mineral oil fractions, and may contain both branched and straight-chain acyclic and/or cycloaliphatic olefins. In the reaction of such olefins with formic acid or with carbon monoxide and water, a mixture is formed of carboxylic acids in which the carboxyl groups are located predominantly at a quaternary carbon atom. Examples of other olefinic starting materials are propylene trimer, propylene tetramer and diisobutylene. The vinyl esters may also be produced from the acids in a manner known per se, for example by reacting the acids with acetylene.

Because of their ready availability, vinyl esters of saturated aliphatic monocarboxylic acids having 9–11 carbon atoms and branched at the carbon atom are particularly preferred.

Furthermore, particular preference is given to the vinyl ester of p-tertiary-butyl benzoic acid. Examples of other suitable vinyl esters are vinyl acetate and vinyl propionate.

As component (e), aromatic vinyl hydrocarbons such as styrene, -alkylstyrenes such as -methylstyrenes, chlorostyrenes, o-, m- and p-methylstyrene, 2,5-dimethylstyrene, p-methoxystyrene, p-tert-butylstyrene, p-dimethylaminostyrene, p-acetamidostyrene and vinyltoluene are employed, with preference being given to the employment of vinyltoluenes and, in particular, styrene.

The monomer employed as component (f) may in principle be any ethylenically unsaturated monomer which is different from (a), (b), (c), (d) and (e), or a mixture of such monomers. Examples of monomers which can be employed as component (f) are monomers containing carboxyl groups, such as acrylic and/or methacrylic acid; amides of acrylic acid and methacrylic acid, for example methacrylamide and acrylamide; nitriles of methacrylic acid and acrylic acid; vinyl ethers and vinyl esters.

It is essential to the invention to add to the binder component (A), after its preparation, from 0.1 to 1% by weight, preferably from 0.4 to 0.9% by weight, of at least one aromatic mono- and/or polycarboxylic acid and/or at least one anhydride of an aromatic polycarboxylic acid. The quantity of acid or anhydride added is in this context related to the weight of the hydroxyl group-containing binder, calculated as solid resin, i.e. without the solvent fraction. Preferred additions in this context are phthalic anhydride and its half-ester, benzoic acid and/or alkyl- and/or alkoxy-substituted benzoic acid. It is particularly preferred to add benzoic acid.

The acid is added preferably at a temperature of from 20 to 120°C., particularly preferably at a temperature of from 40 to 100° C.

The anhydride is added preferably at a temperature of from 100 to 180° C., particularly preferably at a temperature of from 130 to 170° C.

In this respect the acid can be added to the finished coating composition, i.e. after the addition of pigments, fillers, auxiliaries and crosslinking agents. Preferably, however, the acid or the anhydride is added to the acrylate resin (A2) and dispersed to give a maximum degree of homogeneity.

In order to prepare coating compositions, the polyacrylate resin solutions according to the invention are combined with suitable crosslinking agents. The selection of the crosslinking agents is determined by the functional groups of the polyacrylate resin. If, for example, the polyacrylate resin has hydroxy groups, for example isocyanates and/or aminoplast resins, particularly isocyanates, are suitable as crosslinking agents.

However, there may also be used the above-described isocyanates which are reacted with the usual capping agents, e. g. with phenols, alcohols, esters of acetoacetic acid, ketoxims and $\epsilon$-caprolactam. These compositions are stable at room temperature and generally cure at temperatures only in excess of 100° C. In particular cases, e.g. when used with acetoacetic acid esters for capping, a crosslinking may already occur below 100° C.

If the polyacrylate resins contain carboxy groups as the functional groups, there may be used as crosslinking agents for example epoxy compounds having at least 2 epoxy groups per molecule. Since resulting in a low preference for yellowing, there are particularly used aliphatic and/or alicyclic epoxy resins. The crosslinking agent is usually employed in such an amount that the ratio of free carboxy groups of the binding agent, (acrylate copolymer plus optionally further carboxy group-containing polycondensation resin) to the epoxy groups of the epoxy resin is in a range of from 1:3 to 3:1.

Examples for the epoxy resins suitable as crosslinking agents are cycloaliphatic bisepoxides, epoxidized polybutadienes originating from a reaction of commercially available polybutadiene oils with peracids or mixtures of organic acids and $H_2O_2$, respectively, products of the epoxidation of fats, oils, fatty acid derivatives and modified, oils found in nature, epoxy group-containing novolaks, glycidyl ethers of polyhydric alcohols, e.g. ethylene glycol diglycidyl ether, glycerol polyglycidyl ether, sorbitol polyglycidyl ether, trimethylol propane polyglycidyl ether, and pentaerythritol polyglycidyl ether, as well as suitable acrylate resins having side-chain oxirane groups. Furthermore, there may preferably be employed as crosslinking agents reaction products of hydroxy, group-containing polyepoxides with di- or polyisocyanates, for example the compounds obtained by a reaction of OH-functional epoxides (e.g. sorbitol polyglycidyl ethers) with isophorone diisocyanate.

Polar epoxides are also employed as preferred crosslinking agents, for example compounds on the basis of a reaction product of melamine resins with acrylamide, with subsequent epoxidation of the acrylic double bond. This class of substances is exemplified by the commercially available products "Santolink LSE 114" and "Santolink LSE 120". of Monsanto Company. In this product, the epoxide resin backbone is a binuclear melamine wherein the number average molecular weight is about 1,200 to 2,000 and the epoxide equivalent weight is about 300 to 350.

Usually, the coating compositions according to the invention contain 15 to 45% by weight of the acrylate resin and 6 to 20% by weight of the crosslinking agent (B), each based on the total weight of the coating composition and based on the solids content of the binding agent and crosslinker components.

The polyisocyanate component (B) comprises any organic polyisocyanate which contains free isocyanate groups which are attached to aliphatic, cycloaliphatic, araliphatic and/or aromatic structures. The polyisocyanates preferably employed are those containing 2 to 5 isocyanate groups per molecule. It is possible if desired to add to the polyisocyanates small quantities of organic solvent, preferably from 1 to 25% by weight, based on pure polyisocyanate, so as to improve the ease of incorporation of the isocyanate. Examples of solvents which are suitable as additives for the polyisocyanates are ethoxyethyl propionate, butyl acetate and the like.

Examples of suitable isocyanates are described in, for example, "Methoden der organischen Chemie" [Methods in Organic Chemistry], Houben-Weyl, volume 14/2, 4th edition, Georg Thieme Verlag, Stuttgart 1963, page 61 to 70, and by W. Siefken, Liebigs Ann. Chem. 562, 75 to 136.

Suitable examples are 1,2-ethylene diisocyanate, 1,4-tetramethylene diisocyanate, 1,6-hexamethylene diisocyanate, 2,2,4- or 2,4,4-trimethyl-1,6-hexamethylene diisocyanate, 1,12-dodecane diisocyanate, '-diisocyanato-dipropyl ether, cyclobutane 1,3-diisocyanate, cyclohexane 1,3- and 1,4-diisocyanate, 2,2- and 2,6-diisocyanato-1-methyl-cyclohexane, 3-isocyanatomethyl-3,5,5-trimethyl-cyclo-hexyl isocyanate ("isophorone diisocyanate"), 2,5- and 3,5-bis(isocyanatomethyl)-8-methyl-1,4-methano-decahydro-naphthalene, 1,5-, 2,5-, 1,6- and 2,6-bis (isocyanatomethyl)-4,7-methanohexahydroindane, 1,5-, 2,5-, 1,6- and 2,6-bis(isocyanato)-4,7-methanohexahydroindane, dicyclo-hexyl 2,4'- and 4,4'-diisocyanate, 2,4- and 2,6-hexahydrotolylene diisocyanate, perhydro-2,4'- and -4,4'-diphenylmethane diisocyanate, '-diisocyanato-1,4-diethylbenzene, 1,3- and 1,4-phenylene diisocyanate, 4,4'-diiso-cyanatobiphenyl, 4,4'-diisocyanato-3,3'-dichloro-biphenyl, 4,4'-diisocyanato-3,3'-dimethoxybiphenyl, 4,4'-diisocyanato-3,3'-dimethylbiphenyl, 4,4'-diiso-cyanato-3,3'-diphenylbiphenyl, 2,4'- and 4,4'-diisocyanatodiphenylmethane, naphthylene 1,5-diisocyanate, tolylene diisocyanates, such as 2,4- or 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, and also triisocyanates, such as 2,4,4'-triisocyanatodiphenyl ether, and 4,4',4"-triisocyanatotriphenylmethane. The polyisocyanates preferably employed, in combination if desired with the abovementioned polyisocyanates, are those containing isocyanurate groups and/or biuret groups and/or allophanate groups and/or urethane groups and/or urea groups. Polyisocyanates containing urethane groups are obtained, for example, by reacting some of the isocyanate groups with polyols, for example trimethylolpropane and glycerol.

It is preferred to employ aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates. Very particular preference is given to employing mixtures of polyisocyanates which contain uretdione and/or isocyanurate groups and/or allophanate groups and which are based on hexamethylene diisocyanate, as are formed by the catalytic oligomerization of hexamethylene diisocyanate using appropriate catalysts. Otherwise, the polyisocyanate component (B) can also consist of any desired mixtures of the polyisocyanates mentioned by way of example.

The quantity of the crosslinking agent employed is selected such that the ratio of the isocyanate groups of the crosslinking agent to the hydroxyl groups of the binder component is in the range from 1:3 to 3:1. The coating compositions according to the invention usually contain from 15 to 50% by weight of the polyester-modified acrylate resin, from 0 to 30% by weight of the other binder component and from 7 to 50% by weight of the crosslinking agent (B), based in each case on the overall weight of the coating composition and on the solids content of the binder and crosslinking components.

The coating compositions according to the invention also contain one or more organic solvents. These solvents are usually employed in quantities of from 20 to 70% by weight, preferably from 30 to 60% by weight, based in each case on the overall weight of the coating composition.

Examples of suitable solvents are relatively highly substituted aromatic compounds, for example solvent naphtha, heavy benzene, various Solvesso grades, various Shellsol grades and Deasol, and relatively high-boiling aliphatic and cycloaliphatic hydrocarbons, for example various white spirits, mineral terpentine oil, tetralin and decalin, and various esters, for example ethylglycol acetate, butylglycol acetate, ethyldiglycol acetate and the like.

The coating compositions according to the invention may furthermore contain conventional auxiliaries and additives in conventional quantities, preferably from 0.01 to 10% by weight based on the overall weight of the coating composition. Examples of appropriate auxiliaries and additives are leveling agents such as silicone oils, plasticizers such as phosphoric esters and phthalic esters, viscosity-controlling additives, flatting agents, UV absorbers, light stabilizers, texturing agents and, if desired, fillers.

The coating compositions according to the invention may also contain conventional pigments in conventional quantities, preferably from 0 to 40% by weight based on the overall weight of the coating composition. Examples of suitable pigments are organic and inorganic color pigment [sic] and metallic and/or special-effect pigments.

The coating compositions are prepared in a known manner, by mixing and—if desired—dispersing the individual components.

These coating compositions may be applied to a substrate, by spraying, flow coating, dipping, rolling, knife coating or brushing, in the form of a film, the film subsequently being cured to give a firmly adhering coating.

The curing of these coating compositions is carried out conventionally at room temperature or at slightly elevated temperature, preferably at slightly elevated temperature, advantageously at temperatures below 120° C. and preferably at temperatures of between 80° C. and 60° C. The coating compositions can, however, also be cured under baking conditions, i.e. at temperatures of at least 120° C.

Particularly suitable substrates are metals and also wood, plastic, glass and the like.

Because of the short curing times and low curing temperatures, the coating compositions according to the invention are preferably employed for automotive refinishing, and for the finishing of large-size vehicles and goods-vehicle bodies. However, depending on the crosslinking agent employed, they may also be used for the production-line finishing of motor vehicles. Furthermore, they are particularly suitable as solid-color topcoat. However, they can of course also be employed as clearcoat, in particular over a metallic basecoat or a solid-color basecoat.

The present invention therefore also relates to a process for the production of a protective and/or decorative coating on a substrate surface, which process is characterized in that the coating composition according to the invention is applied.

The invention is now illustrated in more detail with reference to exemplary embodiments. All parts and percentages in these examples are by weight, unless expressly stated otherwise.

I.1. Preparation of a Polyester Resin A1:

796 parts of trimethylolpropane, 540 parts of isononanoic acid, 821 parts of phthalic anhydride and 83 parts of xylene are placed in a 4 liter condensation polymerization vessel fitted with stirrer, steam-heated column and water separator and are heated slowly.

Condensation is carried out at a temperature of max. 190° C. up to an acid number of 5 mg of KOH/g and a viscosity of 8.0 dPas (60% in xylene). The batch is then cooled, diluted at 130° C. with 910 parts of Shellsol A, and cooled further to room temperature. The resulting polyester has a solids content of 66.5%, an acid number of 5 mg of KOH/g, a (theoretical) OH number of 97.2 mg of KOH/g and a viscosity of 70 dPas (original). The number-average molecular weight Mn is 1493, the weight-average molecular weight Mw is 13,243 and the polydispersity Mw/Mn is 8.87 (each determined by gel permeation chromatography against a polystyrene standard).

I.2. Preparation of a Polyester Resin A2:

796 parts of trimethylolpropane, 540 parts of isononanoic acid, 821 parts of phthalic anhydride and 83 parts of xylene are placed in a 4 liter condensation polymerization vessel fitted with stirrer, steam-heated column and water separator and are heated slowly. Condensation is carried out at a temperature of max. 190° C. up to an acid number of 10 mg of KOH/g and a viscosity of 7.2 dPas (60% in xylene). The batch is then cooled, diluted at 130° C. with 910 parts of Shellsol A, and cooled further to room temperature.

The resulting polyester has a solids content of 65.4%, an acid number of 8.9 mg of KOH/g, a (theoretical) OH number of 101 mg of KOH/g and. a viscosity of 50 dPas (original). The number-average molecular weight Mn is 1350, the weight-average molecular weight Mw is 7830 and the polydispersity Mw/Mn is 5.8 (each determined by gel permeation chromatography against a polystyrene standard).

I.3. Preparation of a Polyester Resin A3:

796 parts of trimethylolpropane, 540 parts of isononanoic acid, 821 parts of phthalic anhydride and 83 parts of xylene are placed in a 4 liter condensation polymerization vessel fitted with stirrer, steam-heated column and water separator and are heated slowly. Condensation is carried out at a temperature of max. 190° C. up to an acid number of 15 mg of KOH/g and a viscosity of 5.3 dPas (60% in xylene). The batch is then cooled, diluted at 130°C. with 910 parts of Shellsol A, and cooled further to room temperature.

The resulting polyester has a solids content of 66.5%, an acid number of 13 mg of KOH/g, a (theoretical) OH number of 104 mg of KOH/g and a viscosity of 22 dPas (original). The number-average molecular weight Mn is 1241, the weight-average molecular weight Mw is 5843 and the polydispersity Mw/Mn is 4.71 (each determined by gel permeation chromatography against a polystyrene standard).

I.4. Preparation of a Polyester Resin A4:

848 parts of trimethylolpropanei 444 parts of isononanoic acid, 876 parts of phthalic anhydride and 83 parts of xylene are placed in a 4 liter condensation polymerization vessel fitted with stirrer, steam-heated column and water separator and are heated slowly. Condensation is carried out at a temperature of max. 190° C. up to an acid number of 18 mg of KOH/g and a viscosity of 80 dPas (60% in xylene). The batch is then cooled, diluted at 130° C. with 1200 parts of Shellsol A, and cooled further to room temperature.

The resulting polyester has a solids content of 66.5%, an acid number of 16 mg of KOH/g, a theoretical OH number of 114 mg of KOH/g and a viscosity of >90 dPas (original). Because of the high viscosity of the resulting polyester, no further reactions were carried out.

II.1. Preparation of the Hydroxyl Group-containing Acrylate Resins E1 to E5 and C1 to C6

The preparation of the acrylate copolymers was in each case carried out in a 4 liter stainless steel polymerization vessel fitted with stirrer, reflux condenser, a monomer feed and an initiator feed. The components, specified in each case in Table 1, are weighed in and then the initial charge is heated to 165° C.

All of the additions are commenced at the same time; the monomer feed is metered in at a uniform rate over the course of 4 h, and the initiator feed is metered in at a uniform rate over the course of 5 h. During the polymerization the temperature in the vessel is held at 160–165° C.

After this, polymerization is continued for a further 2 h. The resulting acrylate resin solution has a solids content of 80%. The temperature is then lowered to 120° C. and the acrylate resin is diluted with butyl acetate to a solids content of 65%, and the quantity of benzoic acid indicated in Table 1, or the quantity of tert-butyl benzoic acid or hydroxystearic acid indicated in Table 1, is added.

The polyester resin A1 or A2 or A3 and the commercially available vinyl ester of Versatic acid (commercial product VeoVa 10 from Shell Chemie), in each case in the quantities specified in Table 1, are weighed into the initial charge.

The quantities of styrene, OH monomer and methyl methacrylate indicated in each case in Table 1 are weighed into the monomer feed.

14 parts of di-tert-butyl peroxide, 44 parts of Shellsol A (commercially available aromatic solvent mixture having a boiling range of 165 to 185° C.) and 25 parts of xylene are weighed into the initiator feed. This composition of the initiator feed is employed in the preparation of all of the acrylate resins.

II.2. Preparation of the Hydroxyl Group-containing Acrylate Resin E6

The preparation of the acrylate copolymer according to the invention was carried out in each case in a 4 liter stainless steel polymerization vessel fitted with stirrer, reflux condenser, a monomer feed and an initiator feed. The components, indicated in Table 1, of the initial charge, of the monomer feed and of the initiator feed are weighed in, and the initial charge is then heated to 165° C.

The additions are all commenced at the same time; the monomer feed is metered in uniformly over the course of 4 h, and the initiator feed is metered in uniformly over the course of 5 h. During the polymerization the temperature in the vessel is held at 160–165° C. After this, polymerization is continued for a further 2 h. The resulting acrylate resin solution has a solids content of 80%. 7.5 parts of phthalic anhydride are added at 165° C., and the temperature is held at 165° C. for about a further 2 hours. The temperature is then lowered to 120° C. and the acrylate resin is diluted with butyl acetate to a solids content of 65%.

The polyacrylate resin obtained in this way has a solids content of 64.4%, an acid number of 4.4 mg of KOH/g, a viscosity of 3.0 dPas (55% in butyl acetate) and a hydroxyl number of about 90.

II.3. Preparation of the Hydroxyl Group-containing Acrylate Resin C7

The preparation of the hydroxyl group-containing acrylate resin C7 was carried out analogously to the preparation of the acrylate resin E6, but adding 7.8 parts of hexahydrophthalic anhydride instead of phthalic anhydride.

II.4. Preparation of the Hydroxyl Group-containing Acrylate Resin C8

The preparation of the hydroxyl group-containing acrylate resin C8 is carried out analogously to the preparation of the acrylate resin C1, the acrylic acid likewise being weighed into the monomer feed and added with the other monomers.

II.5. Preparation of the Hydroxyl Group-containing Acrylate Resin C9

177 parts of Shellsol A and 113 parts of VeoVa 10 are weighed into the initial charge.

565 parts of styrene 250 parts of hydroxy-n-butyl-acrylate and 201 parts of methyl methacrylate are weighed into the monomer feed.

22.6 parts of di-tert-butyl peroxide, 71 parts of Shellsol A (commercially available aromatic solvent mixture having a boiling range of 165 to 185° C.) and 40 parts of xylene are weighed into the initiator feed.

The polymerization is carried out analogously to the preparation of the polyacrylate resin C1, by heating the initial charge at 165° C. All of the additions are commenced at the same time; the monomer feed is metered in uniformly over the course of 4 h, and the initiator feed is metered in uniformly over the course of 5 h. During the polymerization the temperature in the vessel is held at 160–165° C. After this, polymerization is continued for a further 2 h. The resulting acrylate resin solution has a solids content of 80%. The temperature is then lowered to 120° C. and the acrylate resin is diluted with butyl acetate to a solids content of 65%. 3.94 parts of benzoic acid are then added. After, this, 1133 parts of polyester resin A1 are added to the polyacrylate resin solution.

The polyacrylate resin/polyester mixture obtained in this way has a solids content of 64.5%, an acid number of 4.0 mg of KOH/g, a viscosity of 7.2 dPas (55% in butyl acetate) and a hydroxyl number of about 90. Because of the high viscosity of the polyacrylate resin/polyester mixture, no coating composition was prepared using this mixture.

III. Preparation of the Coating Compositions E1 to E6 and C1 to C8 (Comparative Examples)

III.1. Preparation of the Curing Agent Solution

The curing agent solutions are prepared by mixing the components specified below:
4 parts of catalyst solution[1])
50.6 parts of Desmodur N 3390[2])
10.0 parts of Solvent naphtha
7.5 parts of xylene
1.5 parts of n-butyl acetate 98/100
0.6 part of Baysilon coating additive OL44[3])
14.0 parts of 1-methoxypropyl 2-acetate
11.0 parts of butylglycol acetate 1) the catalyst solution described in section III.3.
2) commercially available polyisocyanate from Bayer AG, a 90% strength solution in butyl acetate/solvent naphtha, 1:1, of a trimer based on hexamethylene diisocyanate and having a number-average molecular weight of about 700, an average functionality of between 3 and 4 and a content of uretdione groups of not more than 5%;
3) commercially available leveling agent based on a polyether-modified methylpolysiloxane from Bayer AG III.2. Preparation of an Adjustment Additive An adjustment additive is prepared by mixing the components specified below:

| | |
|---|---|
| Xylene | 15.0 parts |
| Solvent naphtha | 13.0 parts |
| Petroleum spirit 135/180 | 10.0 parts |
| Butylglycol acetate | 3.0 parts |

-continued

| | |
|---|---|
| n-Butyl acetate 98/100 | 50.0 parts |
| 1-Methoxypropyl 2-acetate | 5.0 parts |
| Butoxyl | 2.0 parts |
| Dipentenes | 2.0 parts |

III.3. Preparation of a Catalyst Solution 1.0 part of dibutyltin dilaurate is mixed with 50 parts of butyl acetate 98/100 and 49 parts of xylene.

III.4. Preparation of Topcoats E1 to E6 and C1 to C8

The topcoats are prepared by adding 5.5 parts of a commercially available organic red pigment (commercial product Novopermrot F2RK 70 from Hoechst) to 38.8 parts of the respective acrylate resin solution together with 3.2 parts of butyl acetate 98/100. The batch is first placed in a dissolver at 2000 revolutions/min for 10 min and then, with cooling, is ground to a Hegmann particle fineness of <10 m. After this a mixture of 3.4 parts of butyl acetate 98/100, 20 parts of a commercially available acrylate resin containing hydroxyl groups and having an OH number of 150 mg of KOH/g (commercial product Macrynal SM 510 N from Hoechst AG), 0.5 parts of a commercially available light stabilizer based on a sterically hindered amine (commercial product Tinuvin 292 from Ciba Geigy), 0.2 part of the catalyst solution described above and 28.4 parts of the respective acrylate resin solution is added, and the mixture is homogenized using a stirrer (1000 revolutions/min).

In order to prepare the topcoats, in each case 4 parts by volume of the resulting mixture are mixed with 1 part by volume of the curing agent solution described above and 1 part by volume of the adjustment additive described above.

III.5. Application of the Topcoats

The resulting topcoat is then applied to phosphatized steel panels which have been treated with filler. The phosphatized steel panels are for this purpose coated with a commercially available, conventional filler (commercial product Glasurit Grundftlier [primer surfacer] 283-1874 from Glasurit GmbH, Münster) based on a binder containing epoxide groups and on an amino-functional curing agent, and are subjected to intermediate drying at room temperature for 1 h. Then the topcoat is applied in 2 spray passes, with a flash-off time of 15 min in between, and dried at 20° C. for 16 h. The dry film thickness is from 50 to 60 m.

The panels coalted in this way are then subjected to various tests. The test results are shown in Table 3.

Explanation opf Table 1

TABLE 1

Composition of the acrylate resins in parts by weight

| | 1 | C1 | C2 | C3 | 2 | C4 | C5 | 3 | 4 | 5 | 6 | C6 | C7 | C8 | C9 |
|---|---|---|---|---|---|---|---|---|---|---|---|---|---|---|---|
| A1 | 700 | 700 | 700 | — | 700 | 700 | 700 | 700 | — | 700 | 700 | 700 | 700 | 700 | 700 |
| A2 | — | — | — | — | — | — | — | — | 700 | — | — | — | — | — | — |
| A3 | — | — | — | 700 | — | — | — | — | — | — | — | — | — | — | — |
| VeoVa | 70 | 70 | 70 | 70 | 70 | 70 | 70 | 70 | 70 | 70 | 70 | 70 | 70 | 70 | 113 |
| Styrene | 350 | 350 | 350 | 350 | 350 | 350 | 350 | 350 | 350 | 350 | 350 | 350 | 350 | 350 | 565 |
| HBA | 155 | 155 | — | — | — | — | — | 155 | 155 | 155 | 155 | 155 | 155 | 155 | 250 |
| HEMA | — | — | 140 | 140 | 140 | — | — | — | — | — | — | — | — | — | — |
| HPMA | — | — | — | — | — | 155 | — | — | — | — | — | — | — | — | — |
| HEA | — | — | — | — | — | — | 125 | — | — | — | — | — | — | — | — |
| MMA | 125 | 125 | 140 | 140 | 140 | 125 | 155 | 125 | 125 | 125 | 125 | 125 | 125 | 120 | 201 |
| AA | — | — | — | — | — | — | — | — | — | — | — | — | — | 5 | — |
| BA | 5 | — | — | — | 5 | 5 | 5 | 10 | 5 | — | — | — | — | — | 3.94 |
| PA | — | — | — | — | — | — | — | — | — | — | 7.5 | — | — | — | — |

TABLE 1-continued

Composition of the acrylate resins in parts by weight

| | 1 | C1 | C2 | C3 | 2 | C4 | C5 | 3 | 4 | 5 | 6 | C6 | C7 | C8 | C9 |
|---|---|---|---|---|---|---|---|---|---|---|---|---|---|---|---|
| HSA | — | — | — | — | — | — | — | — | — | — | — | 10.5 | — | — | — |
| tBBA | — | — | — | — | — | — | — | — | — | 3.65 | — | — | — | — | — |
| HPA | — | — | — | — | — | — | — | — | — | — | — | — | 7.8 | — | — |

A1, A2, A3=polyester resin A1, A2 and A3 respectively
VeoVa=commercially available mixture of vinyl esters of saturated aliphatic monocarboxyiic acids having predominantly 10 carbon atoms and being branched at the carbon atom
HBA=4-hydroxy-n-butyl methacrylate
HEMA=hydroxyethyl methacrylate
HPMA=hydroxypropyl methacrylate
HEA=hydroxyethyl acrylate
MMA=methyl methacrylate
AA=acrylic acid
BA=benzoic acid
PA=phthalic anhydride
HSA=hydroxystearic acid
HPA=hexahydrophthalic anhydride
tBBA=t-butylbenzoic acid

TABLE 2

Characteristics of the acrylate resins and acrylate resin/polyester mixture

| | 1 | C1 | C2 | C3 | 2 | C4 | C5 | 3 | 4 | 5 | 6 | C6 | C7 | C8 | C9 |
|---|---|---|---|---|---|---|---|---|---|---|---|---|---|---|---|
| SC (%) | 65 | 65.8 | 65.5 | 65 | 66 | 65.4 | 64.6 | 64 | 65.2 | 64.6 | 64.4 | 64.2 | 66.1 | 64.3 | 64.5 |
| AN | 5.3 | 2.5 | 2.5 | 6 | 4.5 | 5.3 | 4.7 | 6.6 | 6.7 | 4.2 | 4.4 | 4.5 | 5.0 | 5.6 | 4 |
| OHN | 90 | 90 | 90 | 90 | 90 | 90 | 90 | 90 | 90 | 90 | 90 | 90 | 90 | 90 | 90 |
| Visc. | 2.3 | 2.6 | 2.5 | 2.3 | 2.5 | 2.6 | 4.1 | 3.0 | 2.3 | | 2.4 | 3.0 | 2.6 | 2.1 | 2.6 | 7.2 |
| Mn | 2282 | | | 1893 | | | | | 2102 | | | | | | |
| Mw | 11414 | | | 6267 | | | | | 9555 | | | | | | |
| Mw/Mn | 5.00 | | | 3.31 | | | | | 4.55 | | | | | | |

TABLE 3

Test results of the resulting coatings of Examples 1 to 6 and of Comparative Examples C1 to C8

| Example | Spray mist assimilation | Leveling | Solvent resistance | Pot life | Tesa masking tape test | Regu-Pak masking tape test |
|---|---|---|---|---|---|---|
| 1 | 2 | 3 | 1 | 4–5 h | 1–2 | 1–2 |
| C1 | 2 | 4 | 2 | 5 h | 2 | 2 |
| C2 | 2 | 2 | 5 | 6 h | 4–5 | 4–5 |
| C3 | 2 | 2 | 5 | 6–7 h | 5 | 5 |
| 2 | 2 | 2 | 2 | 6–7 h | 3 | 3 |
| C4 | 2 | 2–3 | 4 | 6–7 h | 4 | 4 |
| C5 | 2 | 2 | 4 | 7 h | 4 | 4 |
| 3 | 2 | 3 | 1 | 3–4 h | 2 | 2 |
| 4 | 2 | 3 | 1 | 5 h | 2–3 | 2–3 |
| 5 | 2 | 2–3 | 1 | 4–5 h | 1–2 | 1–2 |
| 6 | 2 | 2–3 | 1 | 4–5 h | 3 | 3 |
| C6 | 2 | 4 | 1 | 3–4 h | 3 | 3 |
| C7 | 2 | 2 | 1 | 5–6 h | 4 | 4 |
| C8 | 2 | 4 | 2 | 4–5 h | 3–4 | 3–4 |

Summary of the Test Results:

The spray mist assimilation is equally good across all the examples. A rating of >3 or above [sic] for the leveling is no longer acceptable in practice, so that the coating compositions of Comparative Examples C1, C6 and C8 exhibit unacceptable results.

The solvent resistance of the resulting coatings is only acceptable at a rating of 2 or better. Coatings with a rating >2 exhibit dulling phenomena and are no longer acceptable. Therefore the coatings of Comparative Examples C2, C3, C4 and C5 are not suitable with respect to solvent resistance. All the coating compositions show an adequate pot life of at least 3–4 h.

For the most important criterion of the coatings, the masking tape test, the rating for acceptable coatings must be at least 2–3 or better. Therefore, the coatings of Comparative Examples C2, C3, C4, C5 and C8 exhibit a masking resistance which is completely inadequate. The best masking resistance is shown by the coating of Example 1.

I claim:

1. A solvent borne coating composition comprising:
   (A) at least one component which contains hydroxyl groups, comprising
      (A1) from 20 to 60% by weight of at least one polyester having an OH number of 90 to 130, a molecular weight of 1300 to 3500 and a polydispersity of from 5 to 50, and
      (A2) from 40 to 80% by weight of at least one polyacrylate resin which contains hydroxyl groups and has been prepared, at least partially, in the presence of component (A1), from
         (a) from 5 to 50% by weight of one or more monomers selected from the group consisting of 4-hydroxy-n-butyl acrylate, 4-hydroxy-n-butyl methacrylate, 3-hydroxy-n-butyl acrylate, 3-hydroxy-n-butyl methacrylate and hydroxyethyl methacrylate,
      and monomers selected from the group consisting of
         (b) ethylenically unsaturated, copolymerizable monomers containing hydroxyl groups and different from (a) and mixtures of such monomers,
         (c) aliphatic and cycloaliphatic esters of methacrylic acid, aliphatic and cycloaliphatic esters of acrylic acid which are different from (a) and (b), and mixtures of such monomers,
         (d) copolymerizable vinyl esters different from (a), (b) and (c), and mixtures of such monomers,
         (e) aromatic vinyl hydrocarbons different from (a), (b), (c) and (d) and mixtures of such monomers, and
         (f) additional ethylenically unsaturated monomer which is different from (a), (b), (c), (d) and (e) or a mixture of such monomers, the sum of the proportions by weight of monomers (a) to (f) being in each case 100% by weight,
   (B) at least one crosslinking agent, and
   (C) a compound selected from the group consisting of aromatic mono-and polycarboxylic acids, anhdyrides of aromatic polycarboxylic acids and mixtures thereof, wherein said compound (C) is added to component (A) after its preparation or to the coating composition.

2. Coating composition according to claim 1, characterized in that component (A) comprises
   (A1) from 30 to 50% by weight of at least one polyester (A1) and
   (A2) from 50 to 70% by weight of at least one polyacrylate resin (A2).

3. Coating composition according to claims 1 or 2 wherein the polyester (A1) has an OH number of from 90 to 130 mg of KOH/g, an acid number of less than 10 mg of KOH/g, a number-average molecular weight of from 1300 to 3500 and a polydispersity of from 5 to 50.

4. Coating composition according to claim 1, wherein the polyester (A1) has an OH number of from 90 to 110 mg of KOH/g, an acid number of from 1 to 8 mg of KOH/g, a number-average molecular weight of from 1350 to 2000 and a polydispersity of from 5 to 10.

5. A coating composition according to claim 1 or 4 wherein the acrylate resin (A2) has an OH number from 70 to 105 mg of KOH/g and an acid number of from 0 to 8 mg KOH/g.

6. A coating composition according to claim 1 or 4 wherein component (A) has an OH number of from 80 to 150, and an acid number of from 0.1 to 10 mg KOH/g.

7. A coating composition according to claim 1 or 4 wherein component (A) has an OH number of from 85 to 105 mg KOH/g and an acid number of from 4 to 8 mg KOH/g.

8. Coating composition according to claim 1, wherein C comprises from 0.4 to 0.9% by weight, based on the weight of component (A) without solvent.

9. Coating composition according to claim 1, wherein a compound C is selected from the group consisting of benzoic acid, alkyl-substituted benzoic acid, alkoxy-substituted benzoic acid, and phthalic anhydride, and is added to component (A) after its preparation.

10. Coating composition according to claim 1 wherein at least 40% by weight of component (A2) has been prepared in the presence of component (A1).

11. Coating composition according to claim 1, comprising as component (B) compounds selected from the group consisting of diisocyanates, polyisocyanates and mixtures thereof.

12. Coating composition according to claim 1, wherein the polyacrylate resin (A2) comprises
   a) from 5 to 50% by weight of one or more monomers selected from the group consisting of 4-hydroxy-n-butyl acrylate, 4-hydroxy-n-butyl methacrylate, 3-hydroxy-n-butyl acrylate, 3-hydroxy-n-butyl methacrylate and hydroxyethyl methacrylate, together with
   (c) from 5 to 95% by weight of aliphatic and cycloaliphatic esters of methacrylic acid, aliphatic and cycloaliphatic esters of acrylic acid which are different from (a) and (e), and mixtures of such monomers,
   (d) from 0.5 to 30% by weight, of a copolymerizable vinyl ester monomer which is different from (a), (b) and (e), and mixtures of such monomers, and
   (e) from 15 to 80% by weight, of an aromatic vinyl hydrocarbon monomer which is different from (a), (c), (d) and mixtures of such monomers.

13. A coating composition according to claim 12, further comprising
   (b) additional monomers selected from the group consisting of (i) ethylenically unsaturated, copolymerizable monomers containing hydroxyl groups and different from (a), (c) and (d), and mixtures of such monomers, and (f) ethylenically unsaturated monomers different from (a)–(e) and mixtures of such monomers, where the sum of (a)–(f) is 100% by weight.

14. A process for the production of a coating on a substrate surface, comprising the step of applying to a substrate a coating composition according to claim 1.

15. A process according to claim 14 wherein the coating composition applied to the substrate is applied as the topcoat layer.

16. A process according to claim 14 wherein the coating applied to the substrate is a refinish coating composition.

17. A process according to claim 14 wherein the coating applied to the substrate is a solid color topcoat composition.

* * * * *